United States Patent
Raith

(10) Patent No.: US 6,711,408 B1
(45) Date of Patent: Mar. 23, 2004

(54) POSITION ASSISTED HANDOFF WITHIN A WIRELESS COMMUNICATIONS NETWORK

(75) Inventor: Alex Krister Raith, San Diego, CA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/498,785

(22) Filed: Feb. 5, 2000

(51) Int. Cl.[7] ................................................. H04Q 7/20
(52) U.S. Cl. .................... 455/440; 455/436; 455/456.1; 455/456.3; 342/457; 340/988
(58) Field of Search ................................. 455/436, 438, 455/440, 441, 456.1, 456.3; 342/450, 457; 340/990, 825.36, 825.49, 988

(56) References Cited

U.S. PATENT DOCUMENTS

| | | | |
|---|---|---|---|
| 4,750,197 A | * | 6/1988 | Denekamp et al. |
| 5,327,575 A | * | 7/1994 | Menich et al. |
| 5,546,445 A | | 8/1996 | Dennison et al. |
| 5,572,221 A | | 11/1996 | Marlevi et al. |
| 5,649,290 A | * | 7/1997 | Wang |
| 5,669,061 A | | 9/1997 | Schipper |
| 6,163,696 A | * | 12/2000 | Bi et al. |
| 6,263,209 B1 | * | 7/2001 | Reed et al. |

FOREIGN PATENT DOCUMENTS

| | | |
|---|---|---|
| EP | 0703463 A2 | 3/1996 |
| GB | 2271486 A | 4/1994 |

* cited by examiner

Primary Examiner—Sinh Tran
Assistant Examiner—Huy D Nguyen
(74) Attorney, Agent, or Firm—Coats & Bennett, P.L.L.C.

(57) ABSTRACT

A method of using historic data from previous calls made from mobile terminals within a wireless communications network to predict future call management options to maximize quality. The method may include determining a route traveled by a mobile terminal in a mobile communication network by determining the geographic position of the mobile terminal at a plurality of time instants as the mobile terminal is moving within the network. The positions are stored in a memory, and a route is determined when a predetermined number of locations occur within a predetermined area. Once a route is determined, subsequent mobile terminals moving through the network are monitored and their paths are compared with the predetermined routes. The mobile terminal is considered to be moving along the predetermined route when the path matches any of the predetermined routes. The projected path of the mobile terminal along the identified route is used to assist in planning and executing call handoffs for the mobile terminal in an efficient manner.

23 Claims, 8 Drawing Sheets

POSITION ASSISTED HANDOFF WITHIN A WIRELESS COMMUNICATIONS NETWORK

BACKGROUND OF THE INVENTION

The present invention relates generally to the management of mobile terminals in a wireless communication network and, more particularly, to a method for using mobile terminal position and previous handoff information to assist in call management.

In a mobile communication network, service areas are typically divided into a plurality of cells, with each cell typically served by a base station. Mobile terminals within a particular cell communicate over RF channels with the base station serving that cell. The base station may handle a plurality of simultaneous calls from mobile terminals. The base stations are connected with one another and to the Public Switched Telephone Network (PSTN) by mobile services switching center (MSCs). The MSCs coordinate the activities of all the base stations and connect the mobile communication network to the PSTN. A typical MSC may handle 100,000 cellular subscribers and 5,000 simultaneous conversations at a time. The MSC also accommodates billing and system maintenance functions. In some higher density networks, several MSCs are used in a single network.

During the course of a call, a mobile terminal may move from one cell into another. A switching technique called a handoff enables the call to proceed uninterrupted when the user moves between cells. When the mobile terminal moves into a different cell while a call is in progress, the MSC automatically transfers the call from the current channel being used to a new channel belonging to the base station serving the new cell.

Handoff decisions are typically based on received radio signal strength and channel quality as monitored by the base station serving the mobile terminal. Received signal strengths are easily monitored and signal quality for any given channel is often determined by the bit error rate or word error rate over a given channel. A handoff from the current channel to another channel is typically initiated when the signal level or channel quality drops below acceptable levels and another channel is available capable of providing acceptable communications. In some systems, a hysteresis algorithm is applied in order to avoid a ping-pong situation in which a second handoff occurs shortly after a first handoff due to the mobile terminal moving slightly back towards the direction of the original base station. To avoid these situations, the candidate cell may be required to be better than the current cell by a given amount, and not just slightly better, for a predetermined is amount of time before a handoff is executed. This results in a delay for those handoffs that are not subject to the ping-pong effect. The use of hysteresis algorithms may result in overall slower handoffs and reduced system capacity In digital mobile communication networks, such as Global System for Mobile Communications (GSM) and other Time Division Multiple Access (TDMA) networks, it is common for the base stations to enlist the assistance of the mobile terminal to determine when a handoff is required. In order to use a mobile terminal to assist handoff, the serving base station downloads a list of channels, commonly referred to as a neighbor list, at the start of a call or after a handoff. The neighbor list identifies channels in neighboring cells that are potential handoff targets. In a mobile assisted handoff, each mobile terminal measures the received power from surrounding base stations identified by the neighbor list and continually reports the results of these measurements to the serving base station. The signal strength measurements are made by the mobile terminal in-between periods of communication during a call. For example, in GSM and most other TDMA networks, the frequency is divided into eight time slots. The mobile terminal is allocated one time slot for transmissions and another time slot to receive signals from the base station. During the remaining time slots, the mobile terminal is not communicating with the serving base station. The mobile terminal monitors channels belonging to neighboring base stations during these idle periods and then quickly returns to its assigned channels in time to transmit and receive signals in its allocated time slots. The measurements made by the mobile terminal of signals received from neighboring cells are reported back to the serving base station in a scheduled manner so as not to interfere with voice or data transmissions.

The measurement reports provided by the mobile terminal give the base station a list of the signal strength and possibly bit error rates from adjacent cells, as measured by the mobile terminal at its present location. The mobile communication network also knows which adjacent cells have unused radio channels that are available for allocation during a handoff. From the list of available channels, the mobile communication network selects the cell which can best serve the mobile terminal and minimize interference. A suitable traffic channel in that cell is assigned as the target, and the mobile terminal is commanded to retune to the traffic channel in the target cell. At the same time, the call is switched by the MSC from the base station currently serving the mobile terminal to the base station in the target cell. The mobile terminal tunes to the newly assigned channel during one of the idle periods so there is no interruption in transmission. Thus, from the user's perspective, the handoff can be made seamless. While the discussion of handoff in this paragraph has assumed what is known in the art as a hard handoff, a similar process applies during what is known as a soft handoff, but the mobile terminal may communicate with more than one base station for a short period of time in a soft handoff. As used herein, the term handoff (or hand-off) includes both hard and soft handoffs.

There are resource costs and risks associated with a handoff. Handoffs place significant processing and signaling demands on the mobile communication network, consuming network resources that might otherwise be used to handle other calls. In addition, there is a potential for a short break of the communication when the mobile terminal changes channels. And there is a risk of accidentally losing the call during a handoff. Thus, if the handoff performance can be improved, the overall quality as perceived by end-users will be enhanced.

From the above, it is clear that a significant amount of mobile terminal and network resources and power may be used during handoffs to monitor nearby base stations and otherwise assist the handoff process. Further, it should be clear that, because of the signaling demand a handoff places on the mobile communication network, handoffs should be performed as infrequently as possible and only as needed. Accordingly, there is a need for an improved method for managing handoffs to improve overall performance.

SUMMARY OF THE INVENTION

Many calls using mobile terminals are made within cars that are following one or more roads in a given cell and geographic area. Each of these calls should repeatedly experience the same call management and handoff needs because the mobile terminals are traveling the same path as previous users. Currently available mobile communication networks make no use of the fact that a car traveling on a road will most likely be best served by making a handoff at a location that has previously proven successful for mobile terminals that have previously traveled the same road. Therefore, each of these existing networks requires that the calls be handled without taking advantage of previous call experiences.

In one aspect of the present invention, the mobile communication network monitors the position of mobile terminals over time and attempts to match the movement of a given mobile terminal with a predefined route. The current path of the mobile terminal is determined based on the geographic position of the mobile terminal at a number of time instants. This current path is then compared to one or more predetermined routes stored in memory associated with the network to determine whether there is a match between the path and the route. For instance, the comparison may include computing the distance between the current path and the predetermined route over a predefined distance. A metric could also computed that indicates the degree of correlation between the current path and one or more of the routes stored in memory. Information associated with the identified route may then be used to aid in one or more handoffs of the mobile terminal while traveling along the route.

Once a route has been defined and the path of the mobile terminal has been determined to correspond to the route, the network may monitor handoffs occurring along the defined route under other optional aspects of the present invention. When a handoff occurs, the position of the mobile terminal at the time of the handoff is determined and stored in memory. Preferably, for each handoff, a quality metric indicating handoff success or quality is determined and stored. The handoff success can be determined based on measurements such as the signal strength, bit error rate (BER), word error rate (WER), or other channel quality measurements before and after the handoff. Separate metrics can be computed for both the uplink and the downlink or a single metric can be computed that takes both uplink and downlink measurements into account. Once a quality metric is determined for a particular handoff position, the quality metric can be used to make future handoff decisions.

In some optional embodiments of the present invention, ping-pong handoffs can also be reduced. Ping-pong handoffs occur when the mobile terminal moves out of and then back into a cell in a short period of time. Routes stored in memory can be used in this situation to avoid multiple handoffs. If the path of the mobile terminal is identified with a route that experiences ping-pong handoffs, the network will delay handing off, assuming signal quality standards are maintained. Thus, the base station in the first cell will continue to service the mobile terminal for a short period while the mobile is within an adjacent cell (from the perspective of the servicing base station). Preferably, the network will monitor the movement of the mobile terminal as it moves within the adjacent cell and will handoff the call when the quality level drops below a predetermined level, the mobile terminal remains within the second geographic area for more than a predetermined time, or deviates from the predetermined, expected route.

Optional embodiments of the present invention also include a method for sending a channel list for the mobile terminal to monitor for mobile assisted handoff (MAHO) management purposes. The network determines the current position of the mobile terminal as is moves through the geographic area. Based on this position, one or more channels are selected by the network for monitoring by the mobile terminal. This enables the mobile terminal to only monitor a limited number of channels providing for more frequent monitoring. Preferably, the network determines the channels to be monitored based on previous handoffs, and will send the channels to the mobile terminal as it nears an expected handoff location.

In still other embodiments, the location and success of handoffs are monitored by the network to aid in identifying areas having poor service quality.

While in some embodiments of the present invention, the predefined routes are supplied to the mobile communication network, some embodiments of the present invention enable the network to learn or define a route from monitoring the geographic positions of mobile terminals as they move through the geographic area serviced by the network. To do so, the network typically monitors the location of the mobile terminals moving within the network and stores the locations. Eventually, the stored locations will reveal a cluster of heavily traveled routes that correspond to roads and highways. The network further monitors the location and quality levels of handoffs. Based upon the historical information previous monitored by the network, a mobile terminal can be identified as moving along a pre-recognized route and appropriate handoff locations can be determined to best maximize the handoff quality.

In other embodiments, the present invention enables the network to learn a route traveled by a single mobile terminal within the network. The network determines the geographic position of the mobile terminal at a number of time instants as it moves within the geographic area serviced by the network, and stores these positions in memory. The network monitors the memory for areas that have a high concentration of positions within a given geographic area and classifies these as routes for that mobile terminal.

DETAILED DESCRIPTION OF THE INVENTION

Figure 1:
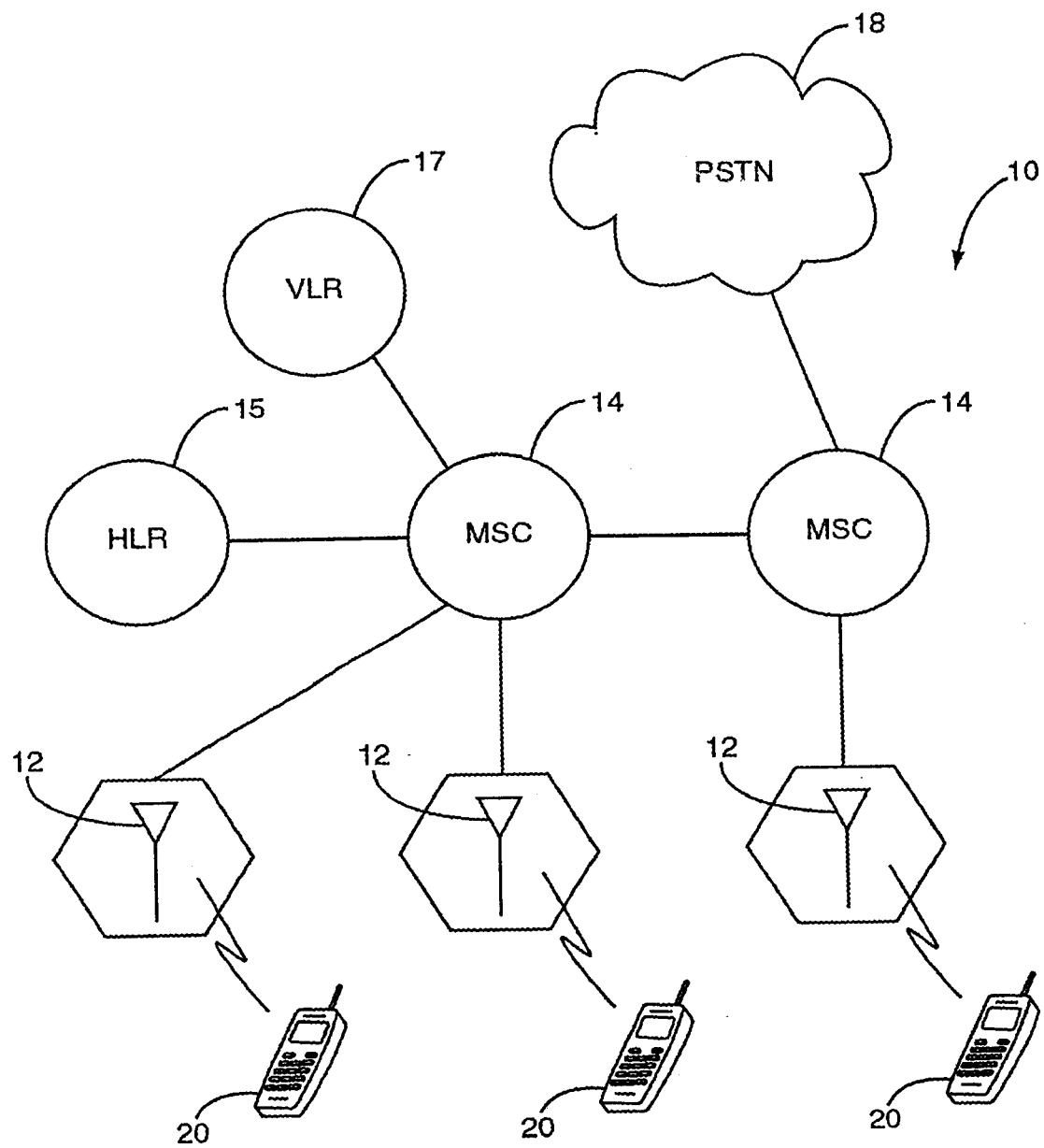
FIG. 1 is a schematic representation of the mobile communication network constructed in accordance to the present invention.

FIG. 1 is a schematic diagram illustrating the basic elements of a mobile communication network, which is indicated generally by the numeral 10. The mobile communication network 10 comprises a plurality of base stations 12 which are connected via a mobile services switching center (MSC) 14 to a terrestrial communications network, such as the Public Switched Telephone Network (PSTN) 18. Each base station 12 is located in, and provides service to, a geographic region referred to as a cell. In general, there is one base station 12 for each cell within a given mobile communication network 10. Within each cell, there may be a plurality of mobile terminals 20 that communicate via radio link with the base station 12. The base stations 12 allow the users of the mobile terminals 20 to communicate with other mobile terminals 20, or with users connected to the PSTN 18. The mobile services switching center (MSC) 14 routes calls to and from the mobile terminal 20 through the appropriate base station 12. Information concerning the location and activity status of mobile terminals 20 may be stored in a Home Location Register (HLR) 15 and a Visitor Location Register (VLR) 17, which are connected to the MSCs 14.

Figure 2:
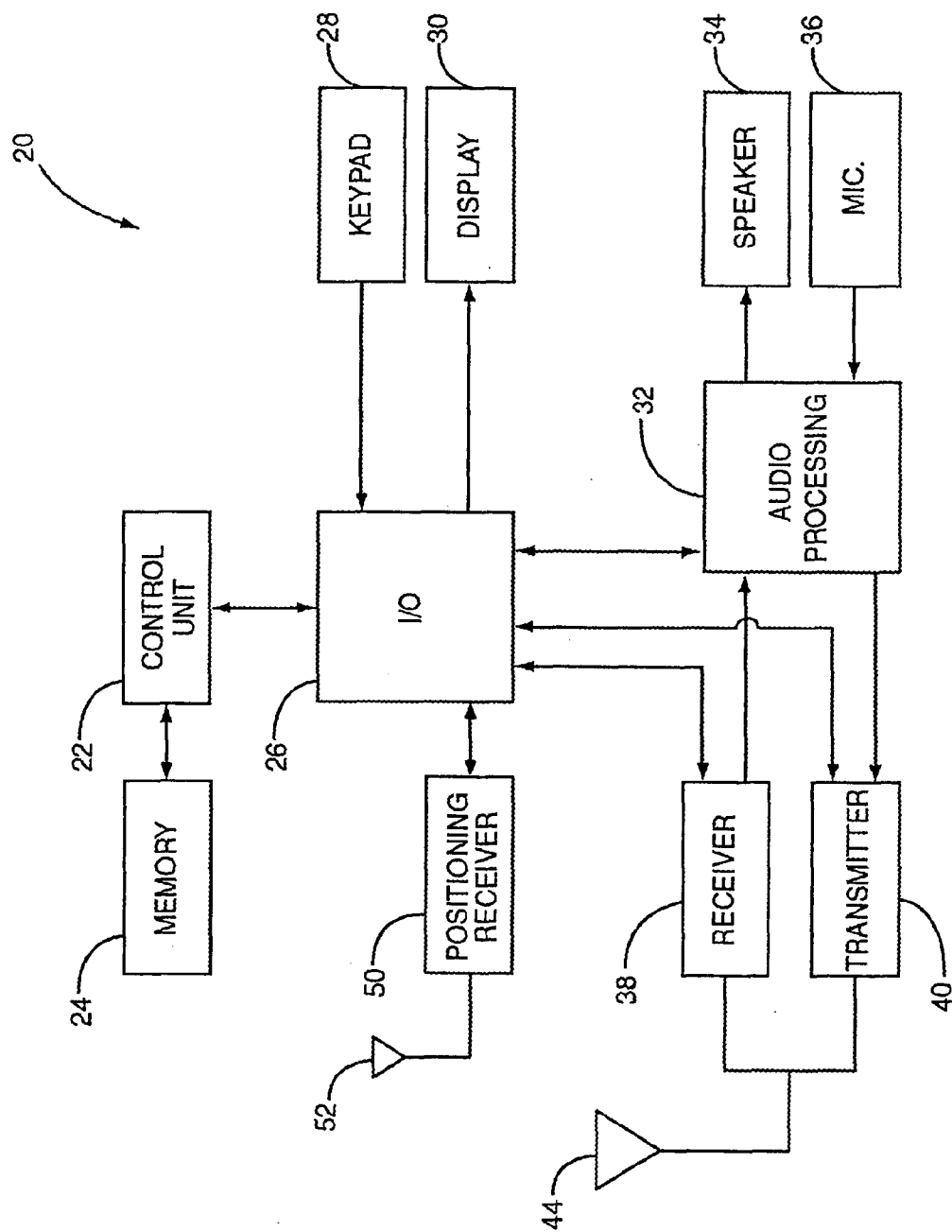
FIG. 2 is a schematic diagram of a mobile terminal.

FIG. 2 is a block diagram of a typical mobile terminal 20. The disclosed embodiment of the mobile terminal 20 is a fully functional cellular telephone, such as an ANSI-136, ANSI-95, or GSM compliant cellular telephone, capable of transmitting and receiving analog and/or digital signals over an RF channel. The mobile terminal 20 includes a main control unit 22 for controlling the operation of the mobile terminal 20 and memory 24 for storing control programs and data used by the mobile terminal 20 during operation. Input/output circuits 26 interface the control unit 22 with a keypad 28, display 30, audio processing circuits 32, receiver 38, transmitter 40, and positioning receiver 50. The keypad 28 allows the operator to dial numbers, enter commands, and select options. The display 30 allows the operator to see dialed digits, stored information, and call status information. The audio processing circuits 32 provide basic analog audio outputs to a speaker 34 and accept analog audio inputs from a microphone 36. The receiver 38 and transmitter 40 receive and transmit signals using shared antenna 44.

The optional positioning receiver 50 enables the mobile terminal 20 to determine its current location based on positioning signals transmitted by earth-orbiting satellite transmitter(s) or terrestrial-based transmitter(s). For example, the positioning receiver 50 could be a Global Positioning System (GPS) receiver. Alternatively, the positioning receiver 50 could also receive positioning signals from terrestrial sources, or determine its position from signals transmitted by one or more base stations within the mobile communication network 10. The positioning receiver 50 may have its own antenna 52 for receiving transmitted signals. Alternatively, the positioning receiver 50 may use the same antenna 44 as used by receiver 38 for communications with the base station 12. The general operation of positioning receivers 50, such as a GPS receiver, are well-known in the art and the details of how they operate are not important to understanding the present invention. It should be noted that as an alternative to the mobile terminal 20 determining its location via the positioning receiver 50, the mobile communication network 10 may determine the position of the mobile terminal 20 by triangulation based on a signal transmitted by the mobile terminal 20 and received at multiple base stations 12 within the network 10.

It should be noted that while the present discussion is focuses on a ANSI-136, ANSI-95, or GSM compliant cellular telephone 20 for clarity, the present invention is not so limited. Indeed, the present invention is applicable to a wide variety of mobile communication networks, including without limitation, Wideband Code Division Multiple Access (WCDMA), Code Division Multiple Access 2000 (cdma2000), Universal Wireless Communications (UWC) 136, and satellite systems such as Globestar. In addition, it is to be understood that other wireless communications mobile terminals 20, such as personal communications assistants, pagers, and the like, are also within the scope of the present invention.

Figure 3:
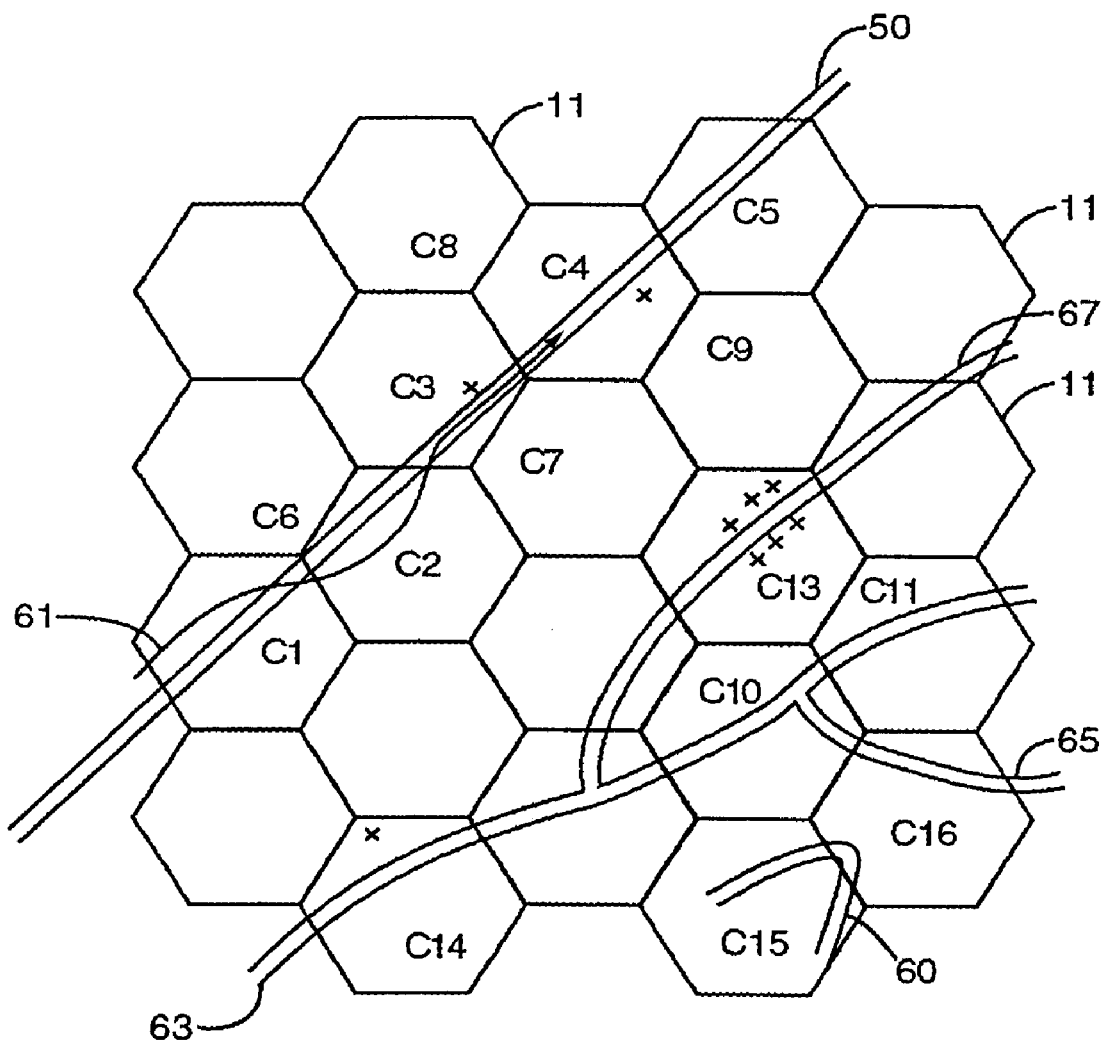
FIG. 3 is a schematic diagram of the cell distribution and predetermined routes extending within a portion of the mobile communication network of FIG. 1.

For illustrative purposes, a hypothetical portion of a mobile communication network 10 shown in FIG. 3 will be used to explain the present invention. As shown in FIG. 3, the mobile communication network 10 provides service to a plurality of cells 11 crossed by roads 50, 60 for example. As shown in FIG. 3, road 50 extends across cells C1, C2, C3, C4, and C5 before extending beyond the geographic area. Likewise, road 60 extends through cells C15 and C16, and so forth. Because many users travel on the roads 50, 60, 63, 65, 67 while using their mobile terminals 20, preferred embodiments of the present invention enable the mobile communication network 10 to learn frequently traveled routes and use learned routes to make hand-off decisions, as described more fully below.

As shown in FIG. 3, there may be any number of routes within a given mobile communication network 10. As used herein, the term "route" means a locus of points corresponding to a trail, such as a road or highway, that is identified to the mobile communication network 10. The term "path" is used to indicate the course or trajectory of a mobile terminal 20 moving through the geographic area serviced by the mobile communication network 10.

In preferred embodiments of the present invention, frequently traveled routes are stored in a route server connected to the mobile communication network 10, such as in the MSCs 14, the HLR 15, or at any other location. The stored routes are used by the mobile communication network 10 to assist in making handoff decisions. One or more hand-off positions along each route are preferably stored in the route server. The mobile communication network 10 monitors the position of mobile terminals 20 moving through the coverage area and attempts to match the paths traveled by the mobile terminals 20 to a stored route. If the path of a mobile terminal 20 is matched to a stored route, the mobile communication network 10 continues monitoring the mobile terminal 20 as it moves along the route. The mobile communication network 10 can anticipate hand-offs as the mobile terminal 20 travels along a stored route by comparing the position of the mobile terminal 20 with the stored hand-off positions. In some embodiments, a quality metric may also be associated with each stored hand-off position. The quality metrics can be used by the network 10 to help decide when to make hand-offs. That is, when multiple hand-off positions are associated with a particular route, the network can use the quality metrics to select the "best" position for executing the hand-off.

Figure 4:
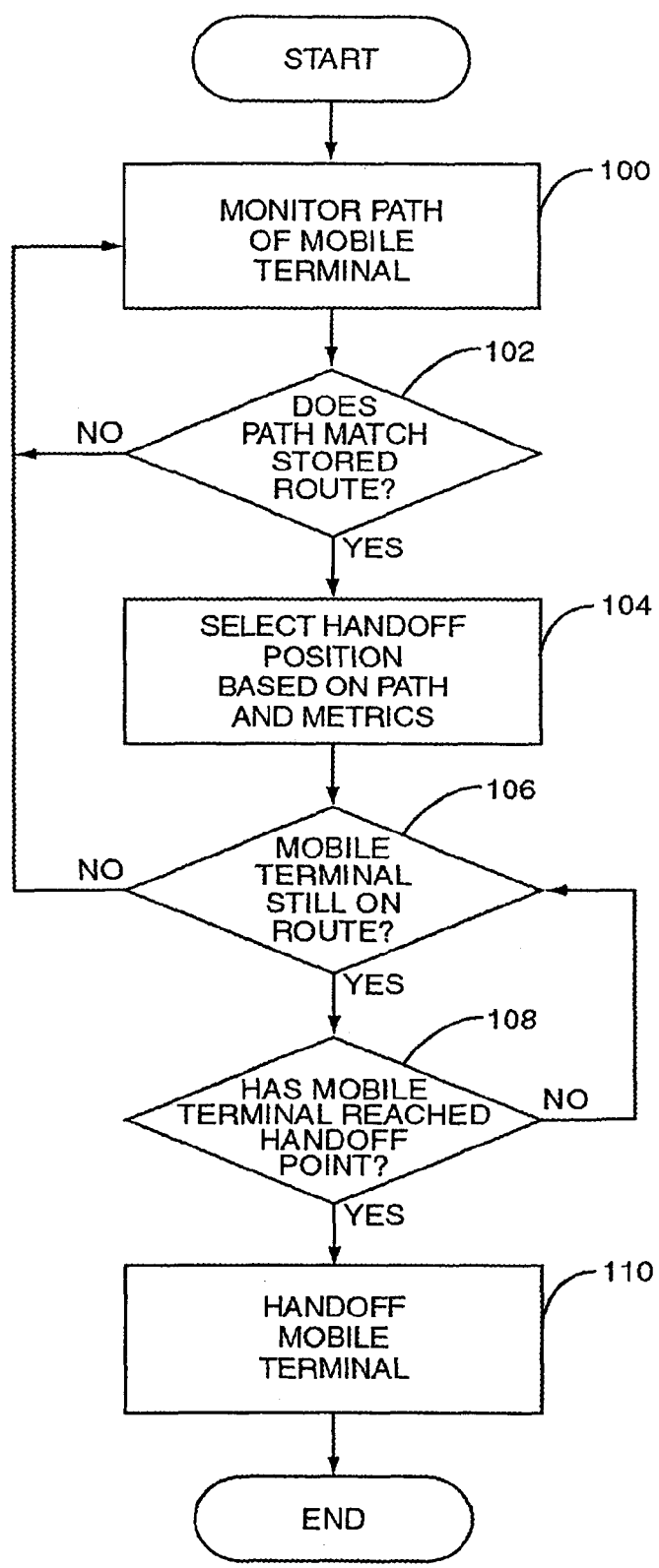
FIG. 4 shows one embodiment of a method of the present invention for handing off a mobile terminal based on travel along an identified route within the mobile communication network of FIG. 1.

Referring to FIG. 4, when a mobile terminal 20 enters the service area of the mobile communication network 10, the position of the mobile terminal 20 is monitored and its path is determined (block 100). The network periodically compares the path traveled by the mobile terminal 20 with one or more routes stored in memory (block 102). The stored routes may be defined external to the mobile communication network 10 and programmed thereinto, or may be determined by the mobile communication network 10 as described below. By way of example, the routes may be represented by a string of coordinates corresponding to different points on the route. If the path of the mobile terminal 20 does not match any route stored in memory (box 102), the mobile communication network 10 continues monitoring the path of the mobile terminal 20 (box 100). If the path of the mobile terminal 20 matches a route stored in memory (box 102), the mobile communication network 10 selects an appropriate handoff position (box 104) based on the identified route and direction of travel. If there are multiple hand-off positions for a particular route, selection of the "best" hand-off position may optionally take into account quality metrics associated with each hand-off position. Once a hand-off position is selected, the mobile communication network 10 continues monitoring the position and path of the mobile terminal 20 to determine whether the mobile terminal is still on the previously matched route (block 106). The position of the mobile terminal 20 is also monitored to determine when the mobile terminal 20 reaches the selected hand-off position (block 108). Once the mobile terminal 20 reaches the selected hand-off position, the mobile communication network 10 instructs the mobile terminal 20 to change to a new control channel in a conventional fashion (block 110).

In order to match the path traveled by a mobile terminal 20 with a stored route, the mobile communication network 10 may track the geographic location of the mobile terminal 20 as the mobile terminal 20 moves through the mobile communication network 10, preferably at periodic time intervals. The mobile communication network 10 then compares the predetermined route stored in memory with the path of the mobile terminal 20 over a predetermined distance or area. When there is less than a defined discrepancy between the two, the mobile communication network 10 validates the match and may stop monitoring the mobile terminal because the future position of the mobile terminal 20 is expected to follow the matched route. If the difference between the stored route and the current path are greater than the predefined amount, the mobile communication network 10 will continue to monitor the mobile terminal 20 for another predetermined distance and compare the difference again. This loop process should continue until the mobile terminal 20 exits the geographic area of the mobile communication network 10.

Preferably, the mobile communication network 10 can compare the path of the mobile terminal 20 for any discrete area with a known route stored in memory to determine whether the path corresponds to a route. Path 61 illustrated in FIG. 3 indicates the path of a mobile terminal 20 moving through the mobile communication network 10. The path traveled through cell C1 may be compared with the route 50. Because the mobile terminal path does not correspond to the predetermined route, the mobile communication network 10 should not find a match. Even when path 61 crosses route 50, a match should not be indicated because the mobile terminal 20 has not traveled along the route for the predetermined distance. Likewise, the path does not correspond to the route through cell C2. At cell C3, the path corresponds with the route 50 and the mobile communication network 10 should determine a match. The mobile communication network 10 may continue to periodically monitor the position of the mobile terminal to ensure it is still on the expected route. The periodic monitoring preferably occurs less frequently once a route is established to assist in freeing network resources. In the event the mobile terminal 20 strays from the route, the mobile communication network 10 will again continue monitoring the path at the increased frequency.

In addition to tracking the geographic positions, the mobile communication network 10 may also track the velocity and direction of the mobile terminal 20. During the periodic time instants that the mobile terminal 20 is monitored, when the mobile communication network 10 determines that the mobile terminal 20 has either stopped moving, or has slowed below a certain speed, the mobile communication network 10 may not require that the position be monitored at the same frequency. By way of example, when the mobile terminal 20 is moving at sixty miles per hour, the mobile communication network 10 may determine the geographic position once every second. However, when the mobile terminal 20 has slowed to ten miles per hour, the mobile communication network 10 may determine the position once every ten seconds. This helps decrease network demand while still accurately maintaining and monitoring the mobile terminal path.

Figure 5:
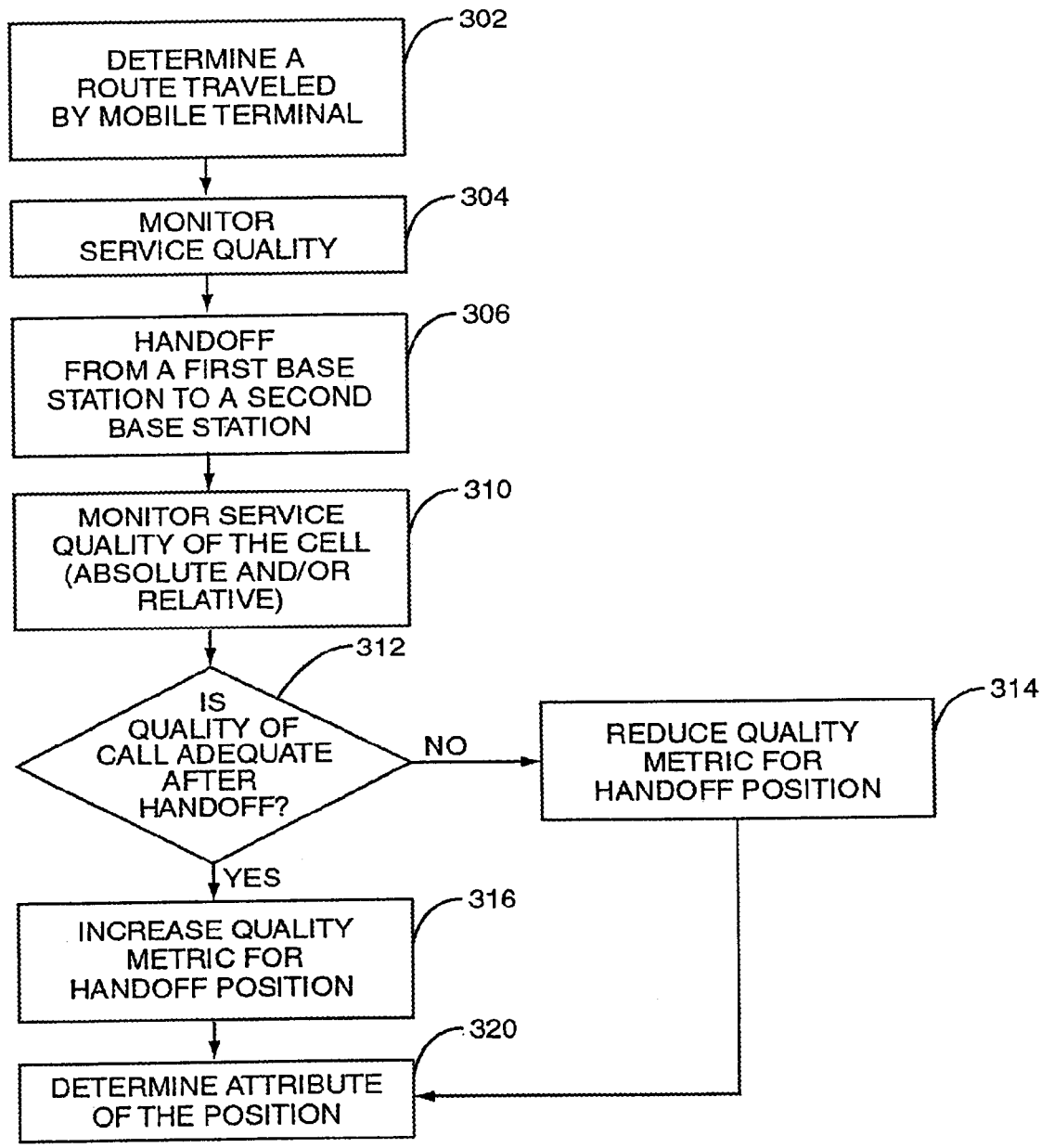
FIG. 5 shows one method of storing and maintaining information regarding handoff locations and attributes.

In order to determine the appropriate handoff positions, the mobile communication network 10 should preferably monitor and evaluate any handoffs that occur and correlate the performance of each handoff with the position of the handoff. FIG. 5 illustrates one process for acquiring and storing such information regarding handoff positions. At least one predetermined route through the network 10 is stored within the memory as previously described. As a mobile terminal 20 then moves through the network 10, its geographic position is monitored and the path is matched with one of the predetermined routes (block 302). The service quality of an active call engaged by the mobile terminal 20 is monitored in any conventional fashion (block 304). The monitoring may include a variety of aspects including radio-link quality on both the uplink (e.g., mobile to base station) and downlink (e.g., base station to mobile). Radio link quality can be measured in a variety of ways well-known in the art, such as by signal strength, BER or WER. As the mobile terminal 20 moves from one cell into another, the call is handed-off from the base station 12 currently serving the mobile terminal 20 to a second base station 12, sometimes referred to as the target base station in the new cell (block 306). After handoff, the service quality is again monitored (block 310). Either the absolute service quality of the handoff, the relative service quality of the handoff between the first base station 12 and the second base station 12, or both, are monitored. A stored quality metric associated with the handoff position is then updated depending upon the service quality of the call (block 312). When the call has reduced quality after being handed off to the second base station 12, the stored quality metric will be downgraded (block 314). When the service quality post-handoff has improved, the stored quality metric is increased (block 316). In either case, the more extreme the difference in service quality, the more extreme the change in the quality metric. By way of example, if a call is lost or disconnected during handoff, the stored quality metric will be severely decreased. Over a period of time, the stored quality metric becomes an effective manner of rating the possible locations and cells for call handoff.

Optionally, an attribute of the handoff may also be stored in memory. Attributes may include the reason for the handoff, such as another cell is received with a stronger signal strength by the mobile terminal 20, the uplink and/or downlink is experiencing poor quality, the servicing cell has no or few remaining voice channels remaining and handoff is necessary to neighboring base stations 12 that may have less capacity constraints to avoid barring new call attempts. Other attributes include identifying the specific mobile terminal 20, identifying the user of the mobile terminal 20, time of day, time of week, etc., or any combination of the above.

Preferably, the selection of subsequent handoff positions (e.g., block 104 of FIG. 4) are thereafter based on the collected quality metrics defined over a plurality of previous calls. These quality metrics should indicate the quality expected for the hand-off and provide the mobile communication network 10 with a means to determine both which base station 12 has historically resulted in the best quality and the best location to execute the handoff.

For example, assume that the mobile communication network 10 must handoff a call for a particular mobile terminal 20 moving along route 50 from cell C1 into cell C2. Because route 50 is positioned near or in cell C6 and C2, the mobile communication network 10 should determine which base station 12 to receive the handoff. By reviewing the quality metric and other attributes, the mobile communication network 10 determines which base station 12 to handoff to so that the mobile terminal 20 can receive the best service. By way of example, the base station 12 within cell C2 may have a quality metric of thirty-five while the base station 12 in cell C6 may only have a quality metric of thirty. The mobile communication network 10 would then handoff the call to base station 12 within C2 because it has historically resulted in the best results. However, if over the next several handoffs the quality is poor, this quality metric may be reduced below thirty. In this event, the mobile communication network 10 would then begin handoffs to the base station 12 within cell C6 because it has a higher expected quality rating.

In some embodiments, the mobile communication network 10 may also maintain attributes for a specific mobile terminal 20. The geographic positions and attributes for the specific mobile terminal 20 may be maintained in a memory location associated with the mobile communication network 10 and monitored by the mobile communication network 10. Once a predetermined density of geographic positions or attributes are obtained, the mobile communication network may use the historic data associated with a particular mobile terminal 20 for determining future call management for the specific mobile terminal 20. For instance, a specific mobile terminal 20 may travel route 63 (FIG. 3) Monday through Friday while traveling to and from work. The mobile communication network 10 will maintain this information and provide for the call to be handed-off from base station 12 within cell C10 to cell C11. However, the mobile communication network 10 has stored enough previous calls to indicate that this specific mobile terminal 20 travels along route 63, but detours onto route 65 on Saturdays. Therefore, when the mobile communication network 10 determines that this mobile terminal 20 is active in a call and moving along route 63 on a Saturday, the mobile communication network 10 will predict the mobile terminal 20 to turn on route 65 and will provide a handoff from cell C10 to cell C12.

Figure 6:
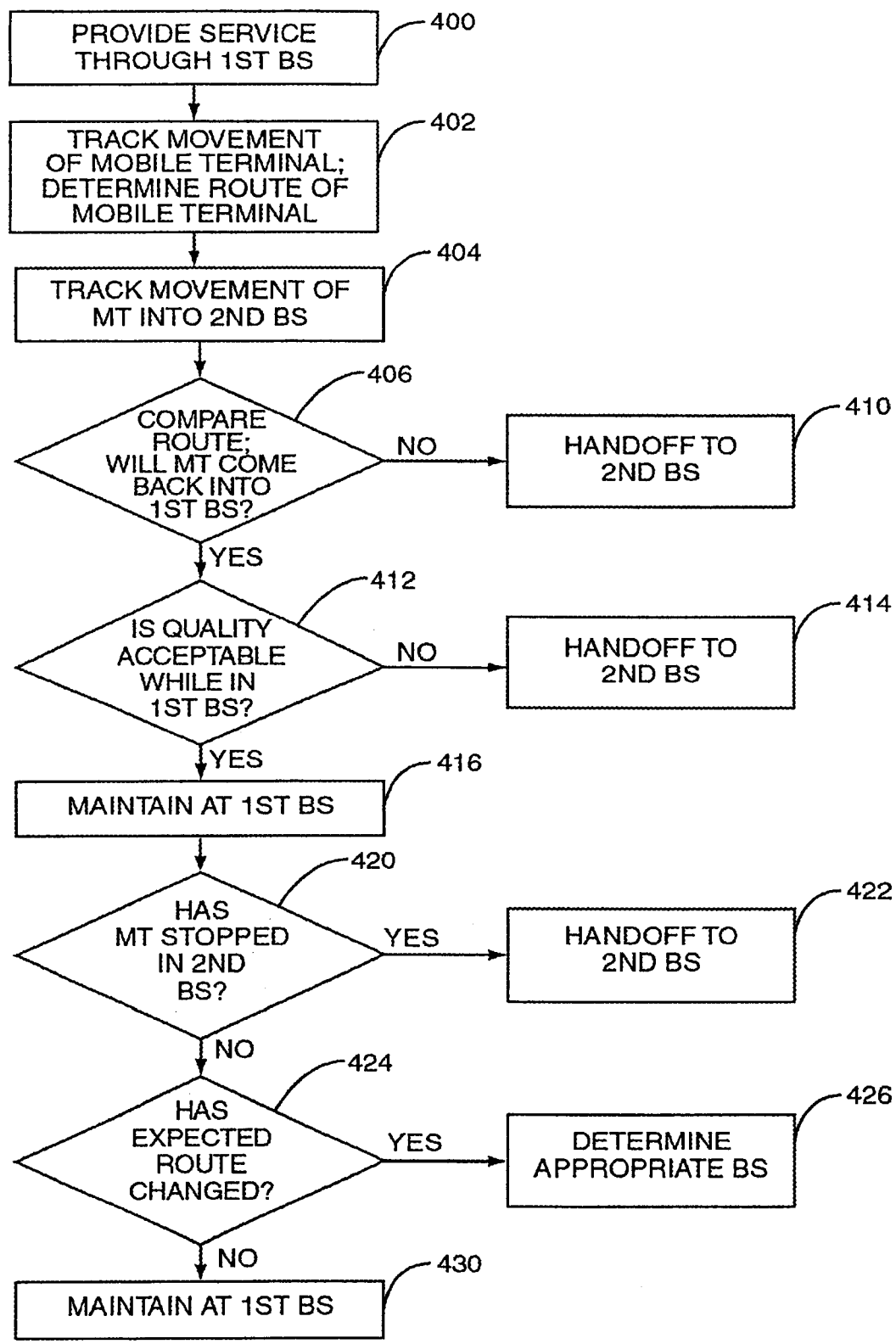
FIG. 6 shows one embodiment of a method of the present invention adapted to avoid ping-pong handoffs.

FIG. 6 illustrates how the handoff method described above may be modified to avoid what is known as ping-pong handoffs. Ping-pong handoffs occur when the mobile terminal 16 moves out of and then back into a cell in a short period of time. It is desirable to avoid ping-pong handoffs because they increase network load and can result in transmission failures. As a mobile terminal 20 moves through the mobile communication network 10, call service is provided through a first base station 12 (block 400). The movement of the mobile terminal 20 is monitored and compared with predetermined routes stored within the memory and the path of the mobile terminal 20 is matched with one of the predetermined routes within the memory as described above (block 402). Knowledge of the route allows the mobile communication network 10 to project the future movements of the mobile terminal 20. The mobile terminal 20 moves into the geographic area normally serviced by a second base station 12 (block 404). The mobile communication network 10 compares the route and determines whether the route returns to the geographic area serviced by the first base station 12 (block 406). If the mobile terminal 20 is not predicted to return to the area of the first base station 12, the call is handed off to the second base station 12 (block 410). If the mobile terminal 20 is predicted to return to the first base station 12, the mobile communication network 10 monitors the quality of the active call (block 412). If the quality of the call falls below a predefined level, due in part to the distance between the mobile terminal 20 and the first base station 12, the mobile communication network 10 will hand the call off to the second base station 12 (block 414). If the quality remains above the predefined level, service will be maintained through the first base station 12 (block 416). The movement of the mobile terminal 20 will also be monitored and if the mobile terminal 20 stops or slows while in the geographic area of the second base station 12 (block 420), the call will be handed to the second base station (block 422). As the mobile terminal 20 continues to move along a predetermined route, the path will be monitored (block 424). If the mobile terminal 20 has deviated from the expected route, the call will be handed off to the appropriate base station 12 (block 426). If the path along the route is maintained as expected, the call will continue to be handled through the first base station 12 (block 430).

A potential ping-pong effect may be demonstrated with respect to FIG. 3. Route 60 moves between the two cells C15 and C16, and is predominantly located within cell C15. As an active mobile terminal 20 moves through cell C15 to the junction of cell C16, the mobile communication network 10 will continue to service the call through the base station 12 within cell C15 because the expected route will return the mobile terminal 20 to cell C15. During the time the mobile terminal 20 moves within cell C16, the mobile communication network 10 monitors the quality level, geographic position, and rate of movement. If any of these parameters vary sufficiently, the mobile communication network 10 will handoff the call to the base station 12 servicing cell C16. However, if the parameters are maintained, the mobile communication network 10 will not handoff the call because the mobile terminal 20 will shortly return to cell C15 and a ping-pong series of handoffs can be eliminated.

Figure 7:
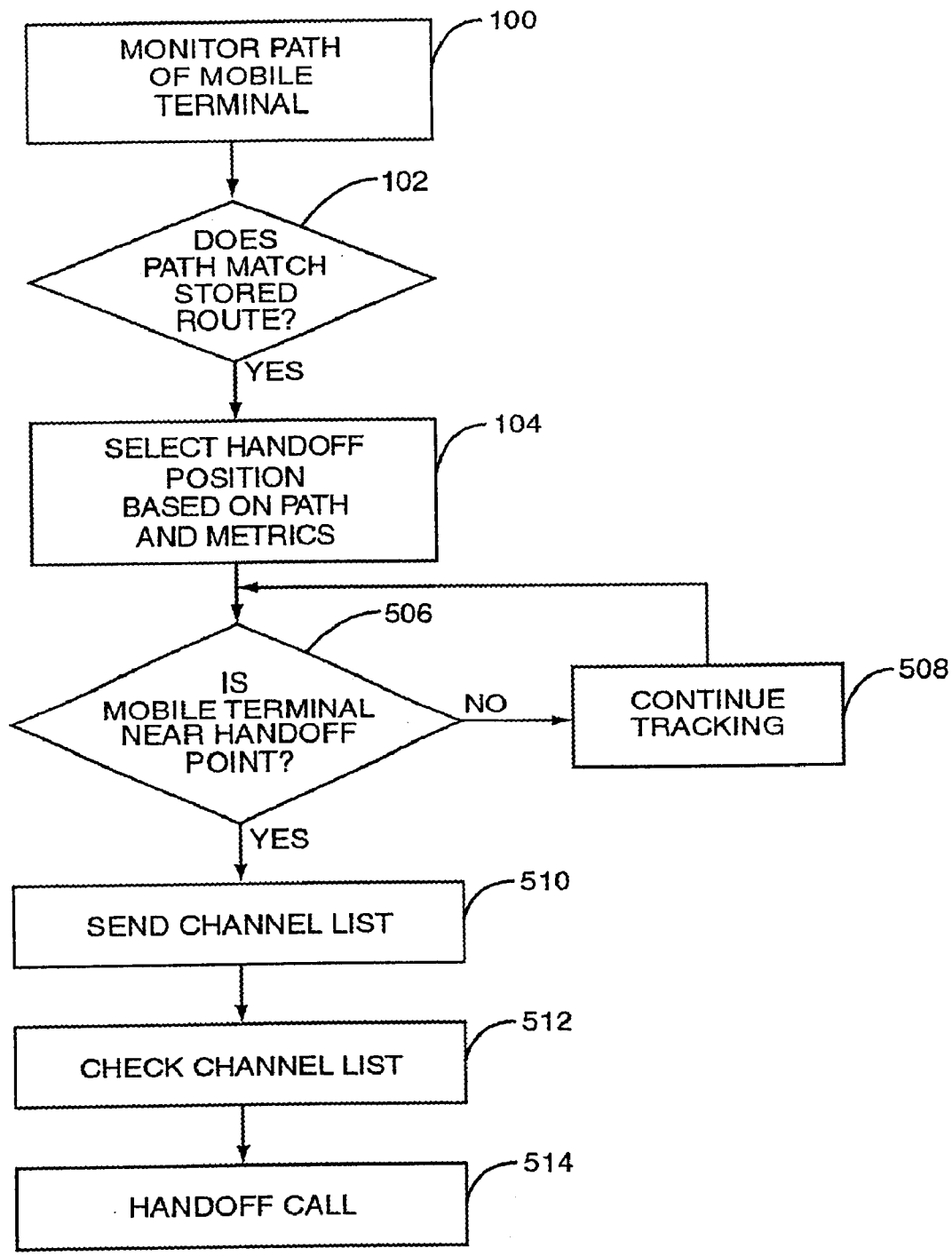
FIG. 7 shows another embodiment of a method of the present invention adapted for use with mobile assisted handoff.

In some embodiments, the present method may used to aid in mobile is assisted handoff(MAHO). Referring to FIG. 7, blocks 100, 102 and 104 are as described with respect to FIG. 4. After a potential handoff position is selected (block 104), the mobile communication network 10 determines whether the mobile terminal 20 is near the handoff point (block 504). To make this determination, the mobile communication network 10 may optionally further determine the speed and direction of the mobile terminal 20 and compute the expected position or distance to the handoff point. If the mobile terminal 20 is not near a handoff point (block 504), the mobile communication network 10 will continue to track the movement of the mobile terminal (block 508). When the mobile terminal 20 nears a handoff point, the mobile communication network 10 sends a list of channels for the mobile terminal 20 to monitor (block 510). The mobile terminal 20 then monitors the channels in a manner known in the art and communicates the appropriate measurements to the base station 12 (block 512). Preferably the channel list of block 510 contains fewer channels than the mobile terminal 20 monitors away from a handoff point. Because there are fewer channels to monitor, the mobile communication network 10 may further request increased measurement resolution, measurement frequency, and position reporting. At the appropriate time based on aggregating prior results and quality metrics stored in memory, and/or based on signal strength returned from the mobile terminal 20, the call is handed off to the best available base station 12 (block 514).

Again, this feature is demonstrated through reference to FIG. 3. As the mobile terminal 20 moves along route 50 within cell C3 towards cell C4, the mobile terminal 20 may be monitoring numerous channels. By way of example, the mobile terminal 20 may monitor base stations 12 within cells C4, C7, C8, and C9 once every second. As the mobile terminal 20 approaches a cell boundary, the mobile communication network 10 may send an instruction to the mobile terminal 20 to only monitor base stations 12 within cells C4 and C7, but to report the monitoring results on an increased frequency of three times each second. At the selected handoff position, the mobile communication network 10 hands-off the call to the base station 12 within cell C4 because of the highest expected quality metric.

Another alternative method of determining handoff is for the network 10 to use a hybrid method of the above-described techniques. By way of example, the network 10 may softly invoke the past history based method using quality metrics with the MAHO reports. The handoff decision may then use a certain percentage (x %) from the past history of the stored quality metrics and the remainder (1−x %) from the MAHO based process. The degree of relative usage of the two methods may be a parameter the service provider for the mobile communication network 10 or the operator of the mobile terminal 20 can modify.

As described above, the present invention may also be used to assist in making what is known as a soft hand-off. During a soft hand-off the mobile terminal 20 communicates with two or more base stations 12 at the same time. As the mobile terminal 20 moves from a first cell into an adjacent cell, the base station 12 in the adjacent sell begins transmitting to the mobile station 20 while the base station 12 in the first cell continues to transmit. As the mobile terminal 20 continues to move in the direction of the adjacent cell, the base station 12 in the first cell will eventually cease transmitting to the mobile station 20. For further information on soft handoffs, see U.S. Pat. No. RE36,017 and U.S. Pat. No. RE36,078, which are incorporated herein by reference. The present invention can be used to develop metrics for locations where transmission from the adjacent cell should begin and locations where transmissions from the first cell should end.

The discussion above has assumed that one or more routes are known to the mobile communication network 10. The mobile communication network 10 may, for instance, be programmed with one or more sets of points that correspond to respective routes. Such information may be provided to the mobile communication network 10 by an external device such as a computer, based on known information about roads and such, such as from an atlas. The points may be defined in terms of coordinates, such as GPS coordinates, in terms of referential vectors, or in any other manner known in the art. Alternatively, the mobile communication network 10 may "learn" routes by examining the history of mobile terminals 20 travelling therein.

Figure 8:
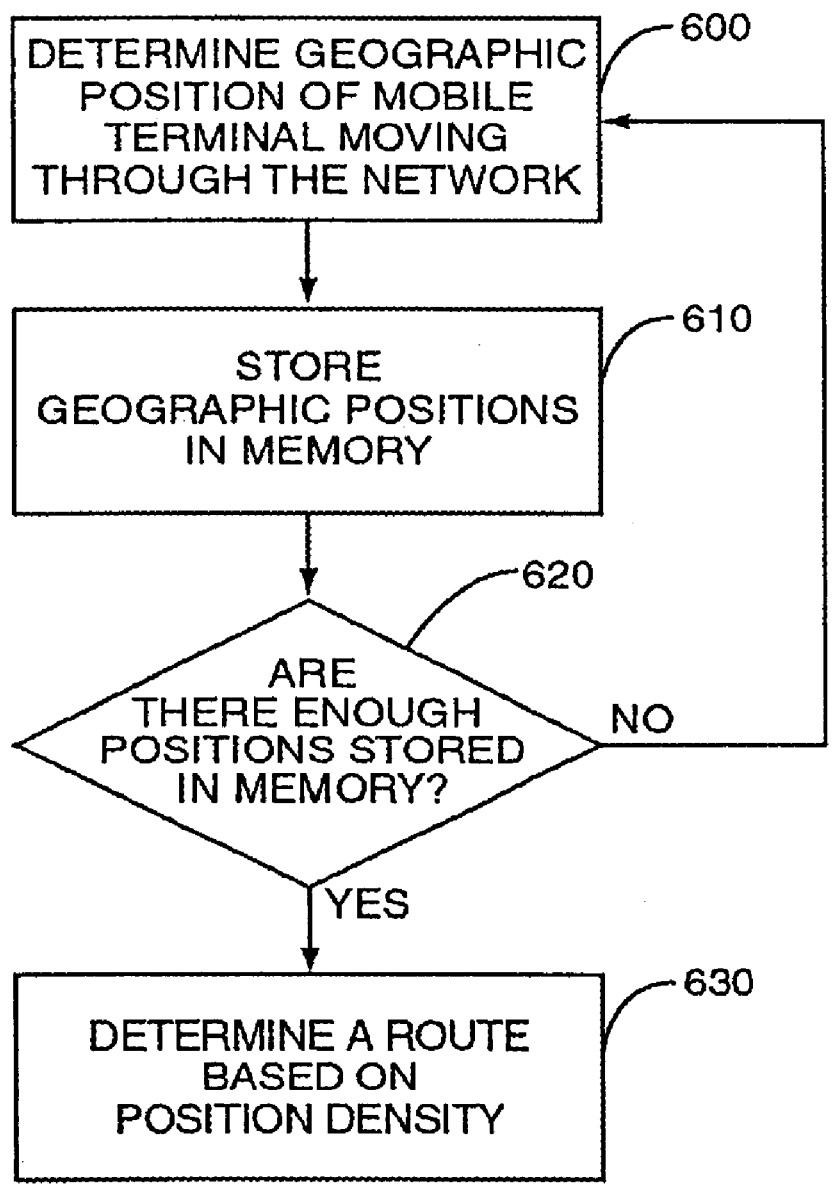
FIG. 8 shows one method according to the present invention for the mobile communication network to learn a route based on mobile terminal travel therein.

FIG. 8 illustrates one process by which the mobile communication network 10 may use for learning and defining a route through the mobile communication network 10. As a mobile terminal 20 moves through the mobile communication network 10, its geographic position is determined at various time intervals (block 600). For instance, the position of the mobile terminal 20 may be determined by a GPS receiver 50 within the mobile terminal 20. The raw position data received by the GPS receiver 50 can be transmitted to the mobile communication network 10 for processing, or can be pre-processed by the GPS receiver 50 and transmitted to the mobile communication network 10 for further processing. The geographic position of the mobile terminal 20 may also be determined based on the strength of a signal transmitted from the mobile terminal 20 and received at a plurality of base stations 12 throughout the mobile communication network 10 (i.e., by triangulating on a signal transmitted from the mobile terminal 20). The accuracy of the geographic positions may vary depending upon the parameters of the mobile communication network 10; for example, the GPS receiver 50 may only be capable of determining a position within an accuracy of one hundred yards. Once the geographic position is determined, it is stored in memory associated with the route server (block 610). Preferably, the memory is maintained at a central location in the mobile communication network 10 which is accessible to one or more MSCs 14. Alternatively, each MSC 14 may have its own route server, since there may be no need for the MSC 14 to have knowledge of routes outside of its own service area. When enough position reports are available (block 620), the mobile communication network 10 identifies the set of positions, or the set of average positions, as a route, or routes, based on the density and shape of the position reports (block 630). For instance, the path of a mobile terminal 20 may be thought of as a series of points connected by line segments. This path is stored in the mobile communication network 10. Thereafter, the path of another mobile terminal 20, or the later path of the same mobile terminal 20, is conceptually added to the first path. This process continues until a suitable average path emerges, such as when the distance between the current path and the running average path is less than some small amount. At this point, the mobile communication network 10 may declare the average path as a route and store the route points in the route server. Alternatively, the mobile communication network 10 may analyze the various position reports and look for a collection of paths that appear to be clustering around a route, such as by looking at the density of points. Of course, any suitable mathematical technique known in the discrimination arts may be used by the mobile communication network 10 to help discern routes.

Although the geographic positions of only a single mobile terminal 20 moving through the mobile communication network 10 may be used, preferably a plurality of mobile terminals 20 are monitored moving through the mobile communication network 10 and their positions stored in memory. Since calls will cluster around roads and highways traveled by mobile customers, the location data stored in memory can be analyzed to determine the location of such roads, etc. By way of example, route 50 may be a major highway with numerous users driving along it on a daily basis resulting in a large number of positions stored in memory in a short period of time. Alternatively, route 60 may be a country road with less traffic thereby requiring a longer amount of time for the mobile communication network 10 to recognize the road. Additionally, new roads may open in the mobile communication network 10 and the continued monitoring by the mobile communication network 10 will ensure that these are classified as a route if heavily traveled.

It should be noted that the mobile communication network 10 may require less historic data for determining future call management for the specific mobile terminal 20. That is, the density of the locations and frequency of the attributes may be less for a single mobile terminal 20 than for that of the mobile communication network 10 to classify a route. By way of example with reference to FIG. 3, the mobile communication network 10 may require a higher density of locations for determining a route used by numerous mobile terminals 20. Route 50 may require a density of fifty positions per hundred square yards because information from every mobile terminal 20 is used for defining the route. Alternatively, the traveled routes of a single user may only require a density of ten positions per hundred square yards before the mobile communication network 10 classifies the route for that mobile terminal 20.

One advantage of monitoring the quality metrics for geographic positions is that the information may be used by the mobile communication network 10 to identifying locations having poor service quality. Each time an active call encounters a service quality falling below a specified threshold, the location of the problem can be stored in memory and plotted on a map of the geographic area serviced by the mobile communication network 10. The quality problems may track handoff difficulties, as well as quality problems encountered during the call. Any locations having a increased density of poor service calls can be easily identified by the mobile communication network 10 or system administrator and remedied. As illustrated in FIG. 3, positions having a poor service quality call are indicated by an "x". Randomly spaced problems including cells C3, C4, and C14 are expected and do not indicate a problem. However, the high density indicated in cell C13 indicates that the mobile communication network 10 is in need of increased service capabilities in this geographic area.

The present invention may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method for determining a route traveled by a mobile terminal in a mobile communication network comprising:

determining the geographic position of one or more mobile terminals at a plurality of time instants;

storing said plurality of geographic positions in a memory; and determining, based on said plurality of geographic positions, one or more routes traveled by said mobile terminals;

wherein said determining one or more routes traveled by said mobile terminals comprises aggregating position data reported by a plurality of said mobile terminals.

2. The method of claim 1 wherein said determining the geographic position of one or more mobile terminals comprises determining the geographic position of one or more mobile terminals while said mobile terminals are active in a call.

3. The method of claim 1 wherein said determining the geographic position of one or more mobile terminals comprises determining the geographic position of one or more mobile terminals based on a signal transmitted by said one or more mobile terminals.

4. The method of claim 1 wherein said one or more mobile terminals include a position estimating device for determining the corresponding mobile terminal's geographic position.

5. The method of claim 4 wherein said determining the geographic position of one or more mobile terminals comprises said position estimating device generating geographic position information and transmitting said geographic position information from said one or more mobile terminals to said mobile communication network.

6. The method of claim 5 wherein said determining the geographic position of one or more mobile terminals comprises said mobile communication network further processing said geographic position information after receipt from said one or more mobile terminals.

7. A method for matching the path traveled by a mobile terminal in a mobile communication network to a predetermined route stored in memory, comprising:

determining the current path traveled by said mobile terminal based on the position of said mobile terminal at a plurality of time instants;

defining predetermined routes by aggregating position data reported by a plurality of mobile terminals;

comparing said current path traveled by said mobile terminal to one or more predetermined routes stored in said memory; and determining whether said current path matches one of said predetermined routes stored in said memory based on said comparison of said current path to said predetermined routes.

8. The method according to claim 7 wherein said comparing said current path traveled by said mobile terminal to said one or more predetermined routes stored in said memory comprises computing a metric representing the correlation between said current path of said mobile terminal and said predetermined route.

9. The method of claim 7, wherein said comparing said current path traveled by said mobile terminal to said one or more predetermined routes stored in said memory comprises comparing said current path traveled by said mobile terminal to said one or more predetermined routes stored in said memory comprises over a predefined distance.

10. The method of claim 7 wherein said determining said current path traveled by said mobile terminal comprises determining the position of said mobile terminal from a signal transmitted by said mobile terminal.

11. The method of claim 10 wherein said mobile terminal includes a position estimating device and wherein said position estimating device helps perform said determining the position of said mobile terminal.

12. A method for tracking handoffs in a mobile communication network comprising:

identifying a route associated with a path traveled by a mobile terminal;

monitoring the position of a mobile terminal traveling along said route;

when a hand-off event occurs, determining the hand-off position of said mobile terminal along said route at the time of said hand-off event;

storing said hand-off position corresponding to said hand-off event in said mobile communication network; and measuring service quality at a predetermined time period before and after said hand-off event and storing said service qualities in said mobile communication network.

13. The method of claim 12 wherein said service quality includes estimate at least one of the following: bit error rate and word error rate.

14. The method of claim 12 further including measuring both an uplink and a downlink service quality.

15. The method of claim 12 further including storing the difference between said before and after service qualities.

16. A method for tracking handoffs in a mobile communication network comprising:

identifying a route associated with a path traveled by a mobile terminal;

monitoring the position of a mobile terminal traveling along said route;

when a hand-off event occurs, determining the hand-off position of said mobile terminal along said route at the time of said hand-off event;

storing said hand-off position corresponding to said hand-off event in said mobile communication network; and storing an indication of the direction said mobile terminal was traveling along said route at the time of said hand-off.

17. A method for tracking handoffs in a mobile communication network comprising:

identifying a route associated with a path traveled by a mobile terminal;

monitoring the position of a mobile terminal traveling along said route;

when a hand-off event occurs, determining the hand-off position of said mobile terminal along said route at the time of said hand-off event;

storing said hand-off position corresponding to said hand-off event in said mobile communication network; and storing an indication of the speed of said mobile terminal at the time of said hand-off.

18. A method for tracking handoffs in a mobile communication network comprising:

identifying a route associated with a path traveled by a mobile terminal;

monitoring the position of a mobile terminal traveling along said route;

when a hand-off event occurs, determining the hand-off position of said mobile terminal along said route at the time of said hand-off event; and storing said hand-off position corresponding to said hand-off event in said mobile communication network; and maintaining an overall service metric associated with each of said handoff positions.

19. A method of determining a handoff for a mobile terminal actively engaged in a call and moving within a mobile communication network, said method comprising:

servicing said mobile terminal through a first base station as said mobile terminal moves through a first geographic area served by said first base station;

matching the movement of said mobile terminal with a predetermined route that is stored in said mobile communication network; and thereafter, maintaining service to said mobile terminal through said first base station when said mobile terminal moves within a second geographic area served by a second base station based upon said route indicating that said mobile terminal will return to said first geographic area.

20. The method of claim 19 further including said first base station handing off said mobile terminal to said second base station if said mobile terminal moves into said second geographic area and a quality level drops below a predetermined level.

21. The method of claim 19 further including timing said mobile terminal as it moves within said second geographic area and further including said first base station handing off said mobile terminal to said second base station if said mobile terminal remains within said second geographic area for a predetermined time.

22. The method of claim 19 further including monitoring the movement of said mobile terminal within said second geographic area and further including determining whether said mobile terminal has deviated from said route while moving within said second geographic area.

23. The method of claim 19 further including tracking the movement of said mobile terminal as it moves within said first geographic area served by said first base station.

\* \* \* \* \*